Patented Nov. 26, 1929

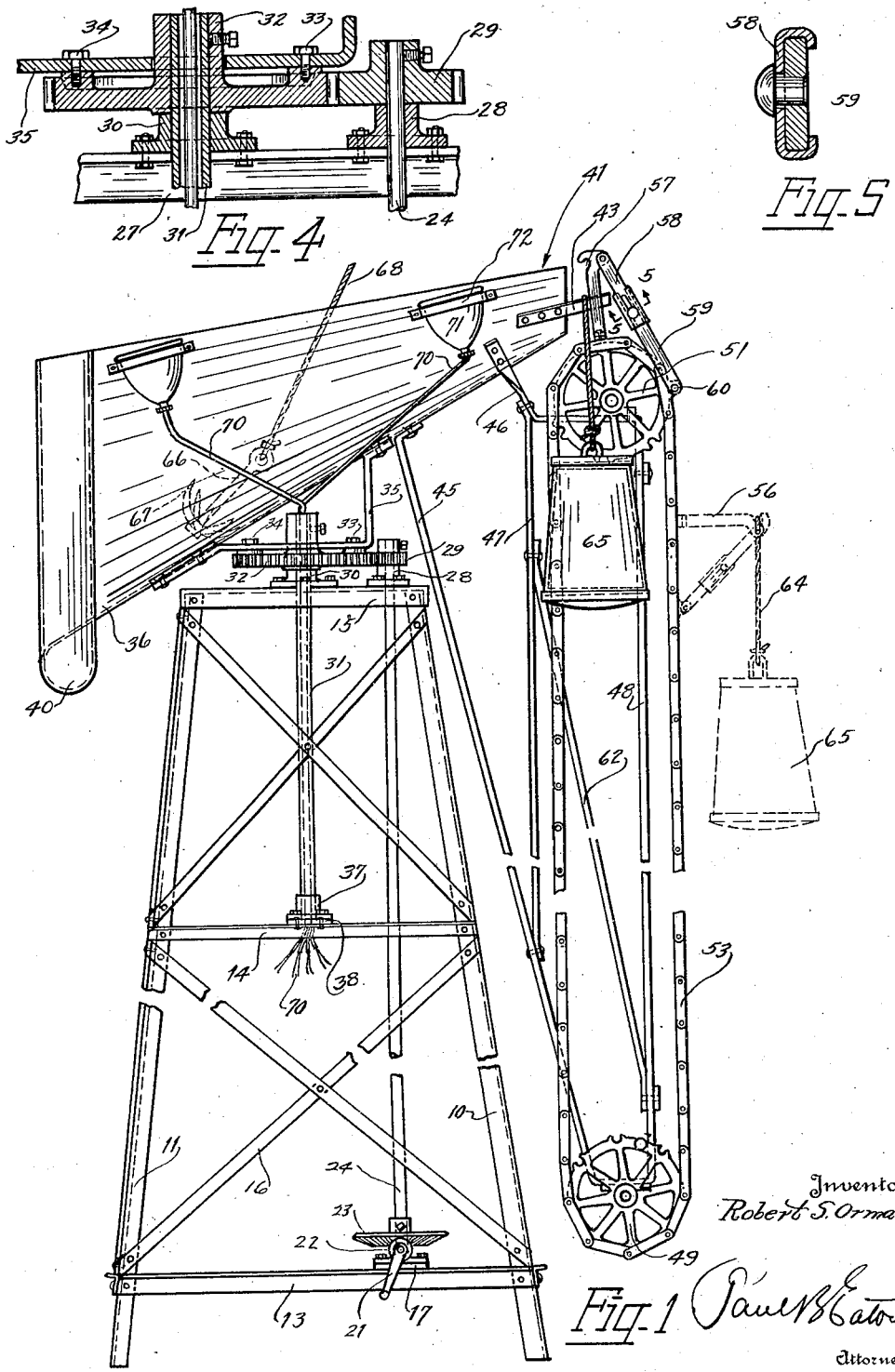

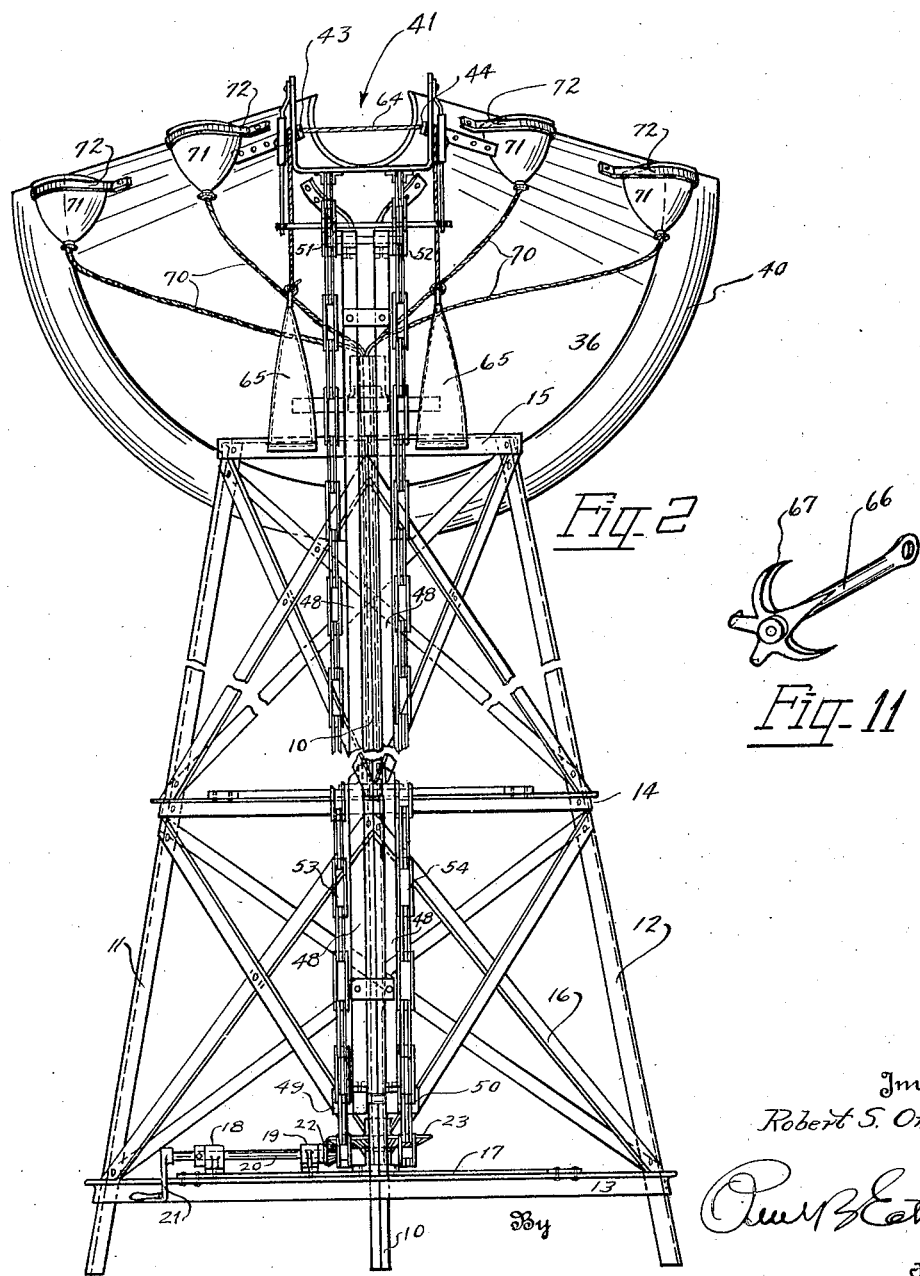

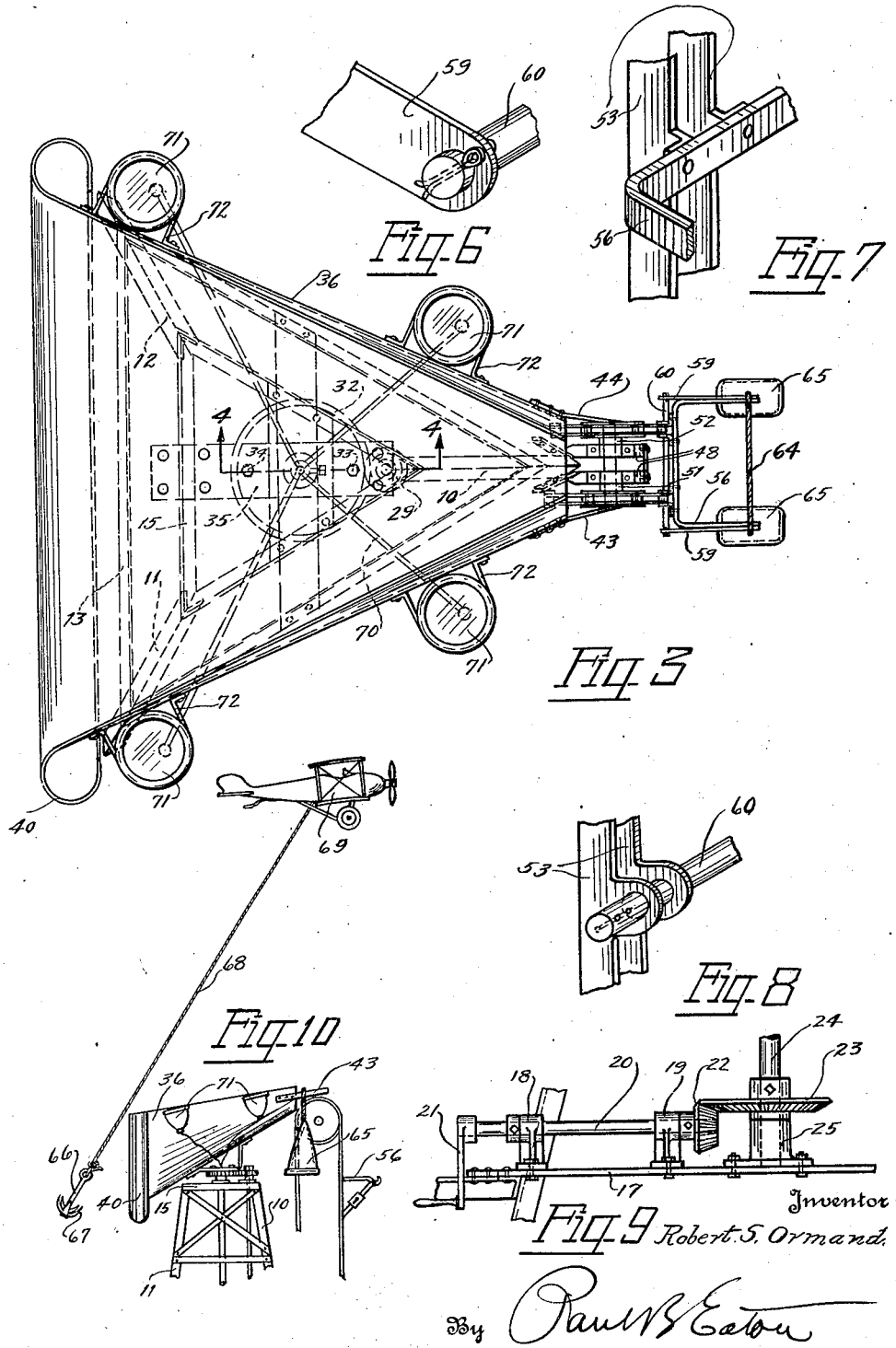

1,737,326

UNITED STATES PATENT OFFICE

ROBERT S. ORMAND, OF BESSEMER CITY, NORTH CAROLINA

MEANS FOR PICKING UP CARGO BY AIRCRAFT

Application filed February 8, 1929. Serial No. 338,476.

This invention relates to means whereby cargo can be picked up by a flying aircraft and carried away by said aircraft, and comprises means for elevating the cargo to the top of the tower and placing the same at the end of a funnel member, said funnel member being adapted to guide a trailing hook which is suspended from the end of the trailing cord, said trailing cord being carried by a flying craft, in such a manner as to pick up the cargo and carry the same away.

An object of my invention is to provide a tower having a rotatable funnel member thereon with means for elevating cargo to the top of the tower and placing the same at the apex of the funnel member, said means being adapted to hold the cargo while an aircraft passes there-over with a trailing cord suspended from the aircraft with a hook on the end of the trailing cord which is adapted to pick the cargo from the end of the funnel and carry the same away.

Another object of my invention is to provide a funnel shaped member adapted to be mounted on top of the tower with means for rotating the said funnel shaped member in any direction, so as to place it in proper position whereby it may engage and direct the hook trailing from an aircraft to cause the said hook to pick up cargo from the tip of the funnel member, together with means for elevating the cargo to the funnel member from whence it will be picked up by the aircraft.

Some of the objects of my invention having been stated, other objects will appear as the description proceeds, when taken in connection with the accompanying drawings, in which—

Figure 1 is a side elevation of my device mounted on top of a tower;

Figure 2 is an elevation looking from the right hand side of Figure 1;

Figure 3 is a plan view of my device;

Figure 4 is a cross-sectional view taken along the line 4—4 in Figure 3;

Figure 5 is a cross-sectional view taken along the line 5—5 in Figure 1;

Figure 6 is an enlarged perspective view of the mounting for the arm through which Figure 5 is taken;

Figure 7 is an enlarged perspective view showing the manner in which the cargo lifting arm is secured to one of the links;

Figure 8 is a perspective detail view of a portion of the cargo lifting means;

Figure 9 is an enlarged elevation showing the means for rotating the funnel member;

Figure 10 is a side elevation showing the top of my device, with an airplane flying thereabove;

Figure 11 is a perspective view of the hook for picking up the cargo.

Referring more particularly to the drawings the reference characters 10, 11 and 12 indicates the up-right portion of my tower on which I desire to mount my device, said members being joined together by the horizontally disposed braces 13, 14 and 15, and the diagonally disposed braces 16. I have shown my tower broken away in Figures 1 and 2 to indicate that it may be made of any desired height. On the member 13 I secure the horizontally disposed member 17 on which I mount the up-right bearing members 18 and 19, in which I secure the horizontally disposed shaft 20 with the crank 21 thereon, said shaft 20 having the bevel-gear 22 which meshes with the bevel-gear 23 on the vertically disposed shaft 24, which leads upwardly to operate the cargo handling means. The lower end of this shaft 24 is mounted in the bearing 25 which is also secured on the horizontal portion 17. On the upper horizontal member 15 I secure the two cross members 27 in which the upper end of the shaft 24 is adapted to be rotatably mounted in the bearing member 28 and on the upper end of the shaft 24 the gear 29 is fixedly secured. Also secured on this member 27 is the bearing member 30 in which the hollow shaft 31 is adapted to be rotatably mounted and on the upper end of this shaft 31 I secure the gear 32, which gear 32 meshes with the gear 29, on the shaft 24. Secured to this gear 32 by means of the bolts 33 and 34 is the brace member 35 on which the funnel member 36 is adapted to be secured. The hollow shaft 31 extends downwardly and has its lower end rotatably mounted in the bearing 37 on the cross member 38 resting on the horizontal portion 14.

This funnel shaped member 36 has the rolled edge 40 and the enlarged end of the funnel is approximately a semi-circle, but it slants inwardly and upwardly to the point 41 where the opening 41 is more than a semi-circle. This portion forming the opening 41 has the forwardly projecting members 43 and 44, which I secured on the out-side of the portion 41 of the funnel shaped member.

Extending downwardly from the smaller end of the funnel shaped member are the braces 45 and 46, and the portion 46 has a horizontal portion from which the members 47 and 48 project downwardly, and have rotatably mounted at the lower end thereof the two sprocket wheels 49 and 50, and on the horizontal portion of the member 46 there is rotatably mounted other similar sprocket wheels 51 and 52, and on these sprocket wheels are mounted the sprocket chains 53 and 54, and projecting from these chains 53 and 54 are the arms 56, which have the hook 57 in the end thereof, and pivotally connected to the end of the member 56 are the arms 58, which project downwardly and are slidably connected to the members 59 which are hingedly connected to other links of the chain as at 60.

The members 47 and 48 are braced by the brace 62 and it is evident that the previously described structure for elevating the cargo moves with the funnel member 36 at all times. These hooks 56 are adapted to hold the cord 64, which cord has the cargo 65 secured at each end thereof, and by pulling the chains 53 and 54 the cargo can be elevated upwardly as shown by the dotted lines in Figure 1 until it reaches the point shown in full line in Figure 1 at which point the slide will permit the arms 59 and 58 to slide apart from each other and when the hook 56 reaches the position shown in Figure 1 the cargo and the cord 64 will be deposited on the members 43 and 44 so that the hook 66 with a plurality of hook members 67 thereon when trailing from the cord 68 secured to the airplane 69 passes over the funnel it will be directed thereinto and pick up the cord 64 and the cargo 65 attached thereto.

The hollow shaft 31 has the wires 70 leading upwardly therethrough which wires 70 are connected to the reflecting light 71 secured on the sides of the funnel by means of the strap 72 so as to form guide-lights to enable an aviator to fly between the lights at nights or to cause the hook 66 to be directed into the funnel member.

The method of operation of my device is as follows:

The hook 56 will be lowered to within reach of a platform or the ground from which the device can be loaded, and the cord 64 with the cargo 65 attached to each end thereof will be placed in the hook portion 57 and the sprocket wheels and the sprocket chains 53 and 54 will be moved to cause the cargo to be carried upward, and as the cargo is being turned over the upper sprocket wheel the arms 58 and 59 will slide to lengthen the same to permit the operation of the device and the cord 64 with the cargo 65 will fall out of the notches 57 and on to the members 43 and 44. When this is done by turning the crank 21 the funnel can be disposed in any direction, and when so disposed an airplane or other flying crafts will fly over the funnel and the trailing cord 68 with the hook 66 attached thereto will be trailed into the large end of the funnel 36, and the peculiar formation of this funnel, its sloping inwardly and upwardly will present mounting of the hook 66, and it will be carried out through the small end 41 of the funnel where it will engage the cord 64 and carry this cord 64 away together with the cargo 65 attached thereto.

In the drawings and specification I have set forth a preferred embodiment of my invention, and although specific terms are employed they are used in a generic and descriptive sense only and not for purposes of limitation, the scope of the invention being set forth in the appended claims.

I claim:

1. In a device for picking up cargo in aerial navigation, a tower, a revoluble semi-conical member rotatably mounted on the upper end of the tower, projections extending from the apex of the semi-conical member, means for rotating the semi-conical member, means for lifting cargo from the lower portion of the tower and automatically placing the same on the projection at the apex of the semi-conical member, said semi-conical member being adapted to guide a hook from a trailing aircraft through the same to cause the hook to pick up the cargo disposed at the apex of the semi-conical member.

2. In a device adapted to be used with an aircraft whereby the aircraft can pick up cargo while in motion, comprising a semi-conical member, means for supporting the semi-conical member, means for rotating the semi-conical member, means of the apex of the semi-conical member for suspending cargo, means associated with the semi-conical member for elevating and depositing cargo at the apex of the semi-conical member, and means for attaching the cargo to a craft flying above the semi-conical member.

3. Apparatus for loading cargo on an aircraft in flight, comprising a semi-conical member adapted to be rotatably mounted on top of a tower, means for holding cargo at the apex of the semi-conical member, and means for elevating and depositing cargo at the apex of the semi-conical member.

4. Supply means for an aircraft comprising an inwardly and upwardly sloping hollow semi-conical member, means at the apex of the said member on which cargo is adapted to be suspended, means for elevating and placing the cargo at the apex of said member, and means secured to an aircraft to cause the aircraft to pick up the cargo after the said suspended means pass through the semi-conical member.

5. Means for passing cargo to a flying craft, comprising a rotatably guiding member, said guiding member being semi-conical and having means for holding cargo at the apex thereof, means for elevating and placing cargo at the apex, and hook means associated with the aircraft adapted to pass through the semi-conical member, and pick up the cargo supported at the apex thereof.

In testimony whereof I affix my signature.

ROBERT S. ORMAND.